United States Patent [19]
Andersson et al.

[11] 3,913,689
[45] Oct. 21, 1975

[54] CORE FOR NUCLEAR REACTORS

[75] Inventors: Ingmar Andersson; Olle Eriksson, both of Vasteras, Sweden

[73] Assignee: ASEA-ATOM, Vasteras, Sweden

[22] Filed: June 28, 1973

[21] Appl. No.: 374,379

[30] Foreign Application Priority Data
Aug. 11, 1972 Sweden............................ 10422/72

[52] U.S. Cl. ...................... 176/87; 176/54; 176/78
[51] Int. Cl. ............................................. G21c 9/00
[58] Field of Search .................... 176/50, 61, 54–56, 176/78, 87

[56] References Cited
UNITED STATES PATENTS

| | | | |
|---|---|---|---|
| 3,235,463 | 2/1966 | Sankovich............................ | 176/78 |
| 3,785,924 | 1/1974 | Notari.................................. | 176/56 |
| 3,801,442 | 4/1974 | Walker et al. ....................... | 176/87 |
| 3,821,078 | 4/1974 | Mansson et al...................... | 176/54 |
| 3,821,079 | 6/1974 | Jabsen ................................. | 176/87 |
| 3,823,065 | 7/1974 | Jones................................... | 176/87 |

*Primary Examiner*—Harvey E. Behrend

[57] ABSTRACT

A core for a nuclear reactor includes a moderator tank and fuel assemblies within the moderator tank. The tank has a lid. The fuel assemblies are fixed by an assembly grid shaped as a lattice, each fuel assembly including a polygonal shroud and a plurality of control rod guide tubes surrounded by the shroud. The walls of the shrouds extend upwardly above the control rod guide tubes. The grid is secured in place by the lid of the moderator tank. The grid has mechanical contact with the upper edges of the shrouds, the vertical planes along the surface of the grids crossing the planes along the surfaces of the shrouds. The mechanical contact is made by downwardly open slots in the sheet metal parts constituting the grid which engage the upwardly extending edges of the shroud.

5 Claims, 4 Drawing Figures

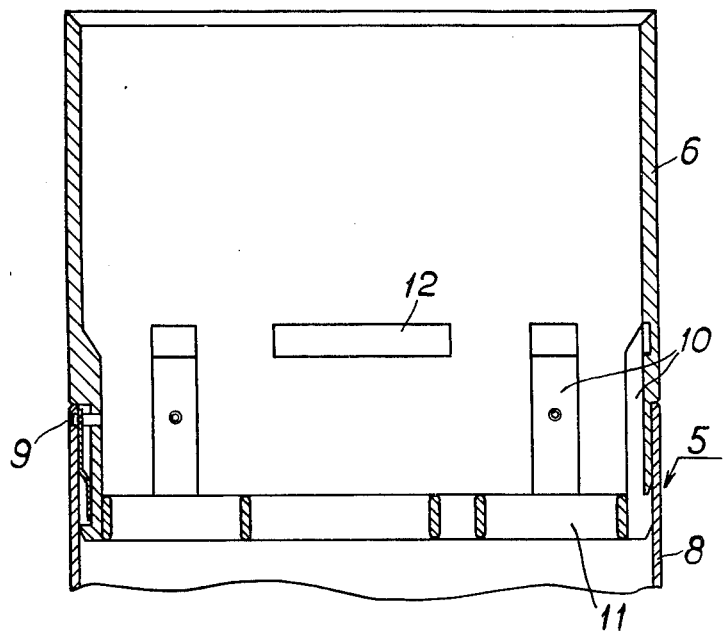
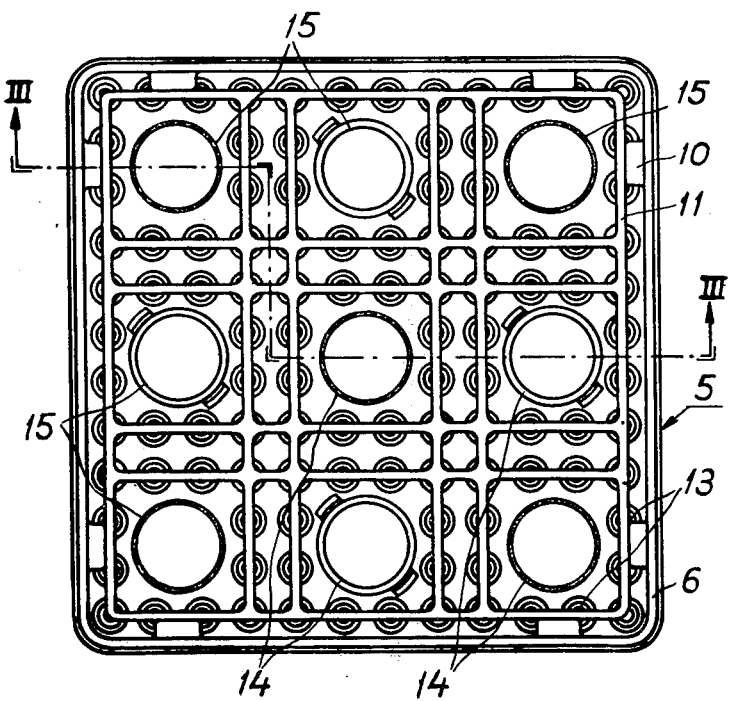

CORE FOR NUCLEAR REACTORS

BACKGROUND OF THE INVENTION

1. Field of the Invention

The present invention relates to a core for nuclear reactors, more specifically to a core in which a plurality of polygonal fuel assemblies are surrounded by a moderator tank having a lid and are fixed by means of an assembly grid shaped as a lattice, each fuel assembly comprising a polygonal shroud and a plurality of control rod guide tubes surrounded by the shroud, the walls of the shroud—at least in a majority of the fuel assemblies—having such an axial extension that their upper edges extend above said control rod guide tubes.

2. The Prior Art

Examinations have shown that a certain obliqueness may arise in the assemblies, for example if the assemblies move towards each other. Furthermore, the gaps between the assemblies may be added together to form a large gap width somewhere in the core. Vibrations in an assembly may propagate to the adjacent assemblies and cause the entire core to vibrate.

There is also a risk of the assemblies being lifted if a pressure surge should occur or because of the lifting power of the flow of water.

SUMMARY OF THE INVENTION

The present invention which is characterised by the fact that the core includes a plurality of polygonal fuel assemblies enclosed in a moderator tank which has a lid, and that the fuel assemblies are fixed by an assembly grid shaped as a lattice. Each fuel assembly includes a polygonal shroud and a plurality of control rod guide tubes therein, the walls of the shroud extending upwardly above the upper ends of the control rod guide tubes. The assembly grid is secured in place by the lid of the tank. The grid is formed of a plurality of vertically running sheet metal parts which have downwardly open slots therein engaging the upwardly extending edges of the shrouds.

With such a structure it is possible to achieve a particularly accurate and safe positioning of the fuel assemblies at the upper part of the core.

Brief Description of the Drawings

An embodiment of the invention will be described in the following with reference to the accompanying drawings, in which FIG. 3 shows in axial section a fuel assembly which can be used in a core according to the invention, whereas FIG. 4 shows the same fuel assembly in an end view.

Description of the Preferred Embodiments

Figure 1:
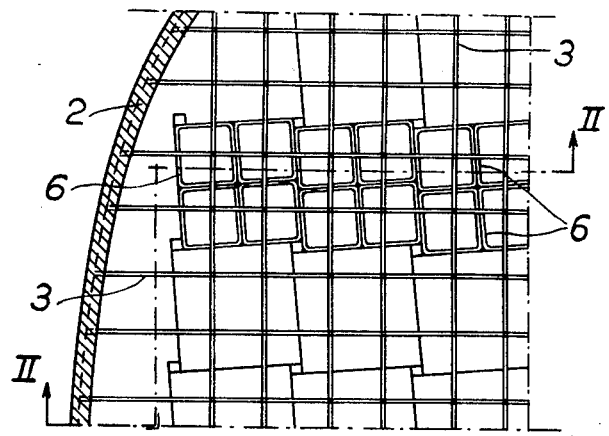
FIG. 1 shows a core according to the invention in partial radial section along the line I—I of FIG. 2.

In the drawings 1 designates a moderator tank in a reactor core according to the invention and 2 the lid of the moderator tank, said moderator tank being arranged to exert a pressure on the edge portions of the upper side of an assembly grid 3 which is formed of sheet metal sections and the lower side of which is provided with a plurality of positioning slits 4 made in the vertical sheet-metal sections, said slits being in engagement with a plurality of fuel assembly shrouds 5, more specifically with a detachable upper section 6 of these shrouds. The shroud section 6 is attached to the main part 8 of the shroud by means of a spring loaded pin 9. The assembly grid 3 may be suspended in the lid of the moderator tank by means of a number of stays 7 in its central section.

The slits of the assembly grid 3 are formed at the bottom with sloping surfaces so that each assembly is guided simultaneously in two different directions in the horizontal plane, thus achieving a good control of the individual assemblies and accordingly an even distribution of the clearances in the assembly gaps.

Figure 2:
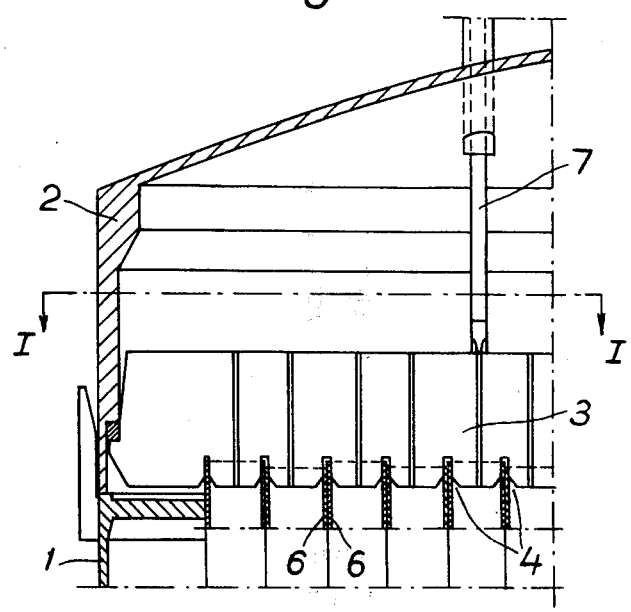
FIG. 2 shows the same core in axial section along the line II—II of FIG. 1.

It is further clear from the drawing (FIG. 2) that only a very small lifting of the fuel assemblies may occur (for example due to pressure surges or the lifting power of the flow of water) before the movement is stopped because the lower edge of the assembly grid exerts a pressure on the upper edge of the assembly shroud.

In each fuel assembly the upper part 6 of the assembly shroud is designed to support a fuel rod grid 11 by means of the ribs 10 and provided with a plurality of recesses 12 intended to form attachment points for lifting member which is designed to lift the fuel assemblies. Each fuel assembly contains a relatively large number of fuel rods 13 and also four water pipes 14 and five control rod guide tubes 15.

The invention is also applicable to other core constructions than that which is shown in the drawings, for example fuel assemblies of circular and hexagonal cross-section. Of course the fuel assembly grid does not have be tilted with respect to the sides of the fuel assemblies.

We claim:

1. In combination, a nuclear reactors core and a moderator tank, a plurality of polygonal fuel assemblies surrounded by said tank, said tank having a lid, and means fixing the fuel assemblies comprising an assembly grid shaped as a lattice, each fuel assembly comprising a polygonal shroud, a plurality of fuel rods and a plurality of control rod guide tubes surrounded by the shroud, the walls of the shroud, at least in a majority of the fuel assemblies, having such an axial extension that their upper edges extend above said control rod guide tubes, means securing said assembly grid in the lid of the moderator tank and said grid securing said assemblies against lateral movement by having a mechanical contact with said upper edges in a major part of the total number of assembly shrouds, the vertical planes along the surfaces of the assembly grid crossing the vertical planes along the surfaces of the assembly shrouds.

2. Core according to claim 1, in which the assembly grid is provided with means for laterally engaging the adjacent shroud parts said mechanical contact being made at the points of such securement.

3. Core according to claim 2, in which the grid is formed of sheet-metal parts and said laterally engaging means comprise vertically running slots in the bottom edge of said sheet-metal parts.

4. Core according to claim 1, in which said fuel assembly shroud comprises a detachable upper part which is arranged with its upper edge above the upper ends of the fuel rods.

5. Core according to claim 1, in which a plurality of stays are arranged between the moderator tank lid and said assembly grid.

* * * * *